(12) United States Patent
Zoller

(10) Patent No.: US 9,359,530 B2
(45) Date of Patent: Jun. 7, 2016

(54) RELEASE LINER FOR PRESSURE SENSITIVE ADHESIVES AND METHOD OF USE

(75) Inventor: Panu K. Zoller, River Falls, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 2158 days.

(21) Appl. No.: 12/158,187

(22) PCT Filed: Dec. 19, 2006

(86) PCT No.: PCT/US2006/048494
§ 371 (c)(1),
(2), (4) Date: Sep. 19, 2008

(87) PCT Pub. No.: WO2007/075724
PCT Pub. Date: Jul. 5, 2007

(65) Prior Publication Data
US 2009/0145542 A1    Jun. 11, 2009

Related U.S. Application Data

(60) Provisional application No. 60/753,996, filed on Dec. 23, 2005.

(51) Int. Cl.
*B32B 37/00* (2006.01)
*C09J 7/02* (2006.01)

(52) U.S. Cl.
CPC .............. *C09J 7/0232* (2013.01); *C09J 7/0207* (2013.01); *C09J 7/0228* (2013.01); *C09J 2201/128* (2013.01); *C09J 2201/606* (2013.01); *C09J 2205/114* (2013.01); *C09J 2427/005* (2013.01); *C09J 2483/005* (2013.01); *Y10T 428/1429* (2015.01); *Y10T 428/1452* (2015.01); *Y10T 428/1476* (2015.01)

(58) Field of Classification Search
None
See application file for complete search history.

(56) References Cited

U.S. PATENT DOCUMENTS

| 2,816,655 | A | | 12/1957 | Crozier et al. |
| 2,862,613 | A | | 12/1958 | Klemka et al. |
| 4,287,255 | A | | 9/1981 | Wong et al. |
| 4,545,843 | A | | 10/1985 | Bray |
| 4,778,703 | A | | 10/1988 | Fontanilla |
| 4,822,451 | A | | 4/1989 | Ouderkirk et al. |
| 5,167,995 | A | | 12/1992 | Johnson et al. |
| 5,178,924 | A | | 1/1993 | Johnson et al. |
| 5,476,443 | A | * | 12/1995 | Cartmell et al. ............... 602/58 |
| 5,491,013 | A | | 2/1996 | Holley |
| 5,525,375 | A | | 6/1996 | Wang et al. |
| 5,845,588 | A | | 12/1998 | Gronnevik |
| 5,932,352 | A | | 8/1999 | Higgins |
| 6,037,028 | A | | 3/2000 | Reinders |
| 6,103,152 | A | | 8/2000 | Gehlsen et al. |

(Continued)

FOREIGN PATENT DOCUMENTS

| EP | 0918079 | 5/1999 |
| JP | 52-045763 | 3/1977 |

(Continued)

*Primary Examiner* — Cheng Huang

(57) ABSTRACT

A double-sided adhesive tape assembly that includes a double-sided tape having a pressure sensitive adhesive ("PSA") on each side thereof and a delaminatable release liner in contact with the pressure sensitive adhesive ("PSA") on one or both sides of the double-sided tape is disclosed. A roll of the double-sided adhesive tape assembly is also disclosed. Methods of making and using the double-sided adhesive tape assembly are also disclosed.

14 Claims, 3 Drawing Sheets

(56) References Cited

U.S. PATENT DOCUMENTS

| | | |
|---|---|---|
| 6,258,427 B1 | 7/2001 | Kerins |
| 6,365,254 B1 | 4/2002 | Zoller et al. |
| 6,451,398 B1 * | 9/2002 | Sylvester ............ 428/41.8 |
| 6,469,372 B2 | 10/2002 | Hayden et al. |
| 6,506,489 B1 | 1/2003 | Ohura et al. |
| 6,630,531 B1 | 10/2003 | Khandpur et al. |
| 6,835,422 B2 | 12/2004 | Kobe et al. |
| 2004/0229000 A1 | 11/2004 | Khandpur et al. |

FOREIGN PATENT DOCUMENTS

| | | |
|---|---|---|
| JP | 06-80846 | 3/1994 |
| JP | 11209706 | 8/1999 |
| JP | 2001240825 | 9/2001 |
| JP | 2004010854 | 1/2004 |
| WO | WO 92/17147 | 10/1992 |
| WO | WO 99/67164 | 12/1999 |
| WO | WO 2005/111166 | 11/2005 |

* cited by examiner

RELEASE LINER FOR PRESSURE SENSITIVE ADHESIVES AND METHOD OF USE

CROSS REFERENCE TO RELATED APPLICATIONS

This application is a national stage filing under 35 U.S.C. 371 of PCT/US2006/048494, filed Dec. 19, 2006, which claims priority to Provisional Application No. 60/753,996, filed Dec. 23, 2005, the disclosure of which is incorporated by reference in its/their entirety herein.

FIELD OF THE INVENTION

This invention relates to release liners. In particular, the present invention relates to release liners for supporting double-sided pressure sensitive adhesive tapes, sheets, etc. that are rolled-up before being dispensed. More particularly, this invention relates to such release liners that can be readily delaminated or otherwise separated into at least two layers. The present invention also relates to methods of using such release liners.

BACKGROUND

Adhesive tapes have been useful in a variety of industrial and automotive applications. Double sided adhesive tapes have been used to bond together a variety of substrates or surfaces and are particularly useful for industrial and automotive applications. Double-sided adhesive tapes having a pressure sensitive adhesive (PSA) on both sides (e.g., in the form of a foam core with a pressure sensitive adhesive on each side) have been found useful in bonding together substrates of similar or dissimilar materials Such double-sided attachment tapes are typically manufactured in wide sheets, laminated onto a release liner of matching width to form an adhesive sheet assembly, and then wound into a roll. The resulting wide adhesive roll assembly is then converted or separated (e.g., by slitting) into a plurality of narrower rolls of tape assembly having the same width or varying widths, depending on the intended use(s) of the adhesive tape.

There is a continuing need for improvements to such double-sided adhesive tape assemblies. The present invention is such an improvement.

SUMMARY OF THE INVENTION

The present invention is directed to an adhesive tape assembly comprising a double-sided adhesive tape having a pressure sensitive adhesive ("PSA") on each side thereof, and a delaminatable release liner attached to one or both outer adhesive surfaces of the double-sided adhesive tape. The adhesive tape assembly is capable of forming a roll of tape having superior roll stability (i.e., the rolls are less likely to fall apart when the roll is held suspended along its outer circumferential edge) compared to double coated tape rolls having two liners. In this way, the present invention satisfies the need for more stable rolls, especially more stable narrow planetary rolls of a tape assembly comprising a double-sided tape with a PSA on each side. The present invention also provides a double-sided PSA tape assembly that includes a delaminatable release liner, portions of which may be easily and efficiently removed in a step-wise order to apply the adhesive tape to one or more substrates.

In one aspect of the present invention, an exemplary adhesive tape assembly comprises a double-sided adhesive tape comprising front and back adhesive sides, each of the adhesive sides comprising a pressure sensitive adhesive; and a delaminatable release liner in contact with, bonded to and readily removable from at least one of the adhesive sides, the delaminatable release liner comprising a first major release surface on an exposed side of the release liner, a second major release surface on an opposite side of the release liner, and a plane of weakness between the first and second major release surfaces, wherein the release liner can be readily delaminated lengthwise along the plane of weakness, between the first and second major release surfaces, so as to form a first delaminated layer and a second delaminated layer, with the first delaminated layer comprising the first major release surface and a first back side surface opposite the first major release surface, and the second delaminated layer comprising the second major release surface and a second back side surface opposite the second major release surface; wherein the adhesive tape assembly has (i) a first bond strength between the first back side surface and the second back side surface, and (iii) a second bond strength between the first major release surface and the front adhesive side, and wherein the second bond strength is lower than the first bond strength.

In a further aspect of the present invention, an exemplary adhesive tape assembly comprises double-sided adhesive tape comprising front and back adhesive sides, wherein each of the adhesive sides comprises a pressure sensitive adhesive; a substrate, wherein the front adhesive side of the double-sided adhesive tape is permanently bonded to a surface of the substrate; and a delaminatable release liner in contact with, bonded to and readily removable from the back adhesive side of the double-sided adhesive tape, the delaminatable release liner comprising a first major release surface on one side of the release liner, a second major release surface on an opposite side of the release liner, and a plane of weakness between the first and second major release surfaces, wherein the release liner can be readily delaminated lengthwise along the plane of weakness, between the first and second major release surfaces, so as to form a first delaminated layer and a second delaminated layer, with the first delaminated layer comprising the first major release surface and a first back side surface opposite the first major release surface, and the second delaminated layer comprising the second major release surface and a second back side surface opposite the second major release surface, wherein the second major release surface is in contact with, bonded to and readily removable from the back adhesive side, and the first major release surface is exposed.

The double-sided adhesive tape comprises front and back adhesive sides, with each of the adhesive sides comprising an acrylic or other suitable pressure sensitive adhesive (PSA). The adhesive tape can further comprise an acrylic or other suitable foam core with the front adhesive side and the back adhesive side forming opposite sides thereof. Each of the first backing layer and the second backing layer has a release material thereon in the form, for example, of an extruded or laminated layer or a coating in contact with, bonded to and readily removable from at least one of the adhesive sides of the tape.

The adhesive tape assembly may further include a tab heat bonded or otherwise adhered to at least one of the first and second backing layers upon separation of the first backing layer from the second backing layer or vice versa. Each tab is operatively adapted (e.g., dimensioned) to facilitate removal of the backing layer it is bonded to from the adhesive tape by pulling on the tab.

The adhesive tape assembly can have a width and be wound into a roll, with both release layers (i.e., the first and second release layers) of the delaminatable release liner contacting the outer adhesive surfaces of the adhesive tape with the resulting roll having an outer circumferential edge. As a result of the present invention, the diameter of the roll can be, for example, at least about 20 times the width of the roll, and the roll not fall apart when held suspended along the outer circumferential edge.

In another aspect of the present invention, a method is provided for permanently adhering or otherwise applying a double-sided pressure sensitive adhesive tape to one or more surfaces such as, for example, a surface on a product such as, e.g., an interior or exterior body molding, a window pane, etc. that is to be adhered to a surface on a vehicle (e.g., a body part of an automobile, aircraft, watercraft, etc.) or a building, and other separate surfaces on opposing substrates, etc. The method comprises providing an adhesive tape assembly like that described above and herein; exposing the pressure sensitive adhesive of an adhesive side (e.g., by unwinding the adhesive tape assembly) along a length of the adhesive tape assembly; and applying, typically so as to permanently adhere, the exposed pressure sensitive adhesive of the adhesive side of each length of the adhesive tape assembly to a first substrate with the delaminatable release liner positioned over the unexposed pressure sensitive adhesive of the other adhesive side.

It is often desirable for the adhesive tape assembly being provided to be in the form of a planetary or other desired roll. When the tape assembly is provided in roll form, the method comprises unwinding the roll to expose the pressure sensitive adhesive of an adhesive side of the adhesive tape assembly, optionally cutting the adhesive tape assembly into discrete sections of desired lengths, and then applying the adhesive tape assembly to a first substrate as described above. Each of the discrete lengths can have a length and a width suitable for adhering a component onto a vehicle, building or other substrate.

The method can further comprise removing at least a portion of an outer portion of the delaminatable release liner (i.e., the first or second delaminated layer) on the one or more lengths of the adhesive tape assembly so as to expose a previously unexposed back side surface of an inner portion (i.e., the second or first delaminated layer) of the delaminatable release liner previously in contact with, bonded to and readily removable from the outer portion. Removing the outer portion of the delaminatable release liner results in an article assembly comprising the first substrate having thereon the adhesive tape covered by an inner portion (i.e., the second or first delaminated layer) of the delaminatable release liner. The article assembly may be further processed (e.g., painted) prior to removal of the inner portion of the delaminatable release liner, and then subsequently bonded to a second substrate by removing the inner portion of the delaminatable release liner and bringing the second substrate into contact with the exposed pressure sensitive adhesive surface on the other adhesive side of each length of the adhesive tape assembly; and applying, typically so as to permanently adhere, the exposed pressure sensitive adhesive of the other adhesive side of each length of the adhesive tape assembly to a second substrate. In this way, the adhesive tape is applied between, typically so as to permanently adhere together, the first substrate and second substrate.

To make it easier to remove the inner portion (i.e., the second or first delaminated layer) of the delaminatable release liner from the adhesive tape, the present method can further comprise heat bonding or otherwise adhering a tab to the back side surface of the inner portion (i.e., the second or first delaminated layer) of the delaminatable release liner along one or more lengths of the adhesive tape assembly. The tab is adhered sufficiently so as not to detach from the inner portion of the delaminatable release liner before at least a portion of the inner portion of the delaminatable release liner is pulled off of the adhesive tape. In this way, a tab can be used to at least facilitate the removal of the inner portion of the delaminatable release liner. Before or after the outer portion of the delaminatable release liner is removed from the adhesive tape, a tab can be bonded to the inner portion of the delaminatable release liner on the one or more lengths of the adhesive tape assembly.

Typically, when a tab is bonded to the back side surface of the inner portion of the delaminatable release liner, the outer portion and the inner portion of the delaminatable release liner are removed one after the other, rather than at the same time, and are removed only after the first exposed adhesive side has been applied, typically so as to permanently adhere, to a first substrate. Thus, the present method can further comprise removing the inner portion of the delaminatable release liner on the one or more lengths of the adhesive tape assembly by pulling on a tab bonded thereto, so as to expose the other adhesive side of each length of the adhesive tape assembly; and applying, typically so as to permanently adhere, the exposed pressure sensitive adhesive of the other adhesive side of each length of the adhesive tape assembly to a second substrate such as, for example, a surface of a vehicle (e.g., part of an automobile, aircraft or, watercraft), a building, or the like. In this way, the adhesive tape can be applied between, typically so as to permanently adhere together, the first substrate and second substrate.

In one aspect of the present invention, an exemplary method of applying a double-sided pressure sensitive adhesive tape to one or more surfaces comprises (I) providing an adhesive tape assembly, wherein the adhesive tape assembly comprises a double-sided adhesive tape comprising front and back adhesive sides, each of the adhesive sides comprising a pressure sensitive adhesive; and a delaminatable release liner in contact with, bonded to and readily removable from the back adhesive side of the double-sided adhesive tape, the delaminatable release liner comprising a first major release surface on one side of the release liner, a second major release surface on an opposite side of the release liner, and a plane of weakness between the first and second major release surfaces, wherein the release liner can be readily delaminated lengthwise along the plane of weakness, between the first and second major release surfaces, so as to form a first delaminated layer and a second delaminated layer, with the first delaminated layer comprising the first major release surface and a first back side surface opposite the first major release surface, and the second delaminated layer comprising the second major release surface and a second back side surface opposite the second major release surface, wherein the second major release surface is in contact with, bonded to and readily removable from the back adhesive side, and at least a portion of the first major release surface is exposed; (II) applying the front adhesive side of the adhesive tape to a first substrate; (III) at least partially removing the first delaminated layer by separating the first delaminated layer from the second delaminated layer; and (IV) bonding a tab to the second back side surface of the second delaminated layer, such that the second delaminated layer can be removed from the tape by pulling on the tab.

DETAILED DESCRIPTION OF THE INVENTION

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

Figure 1:
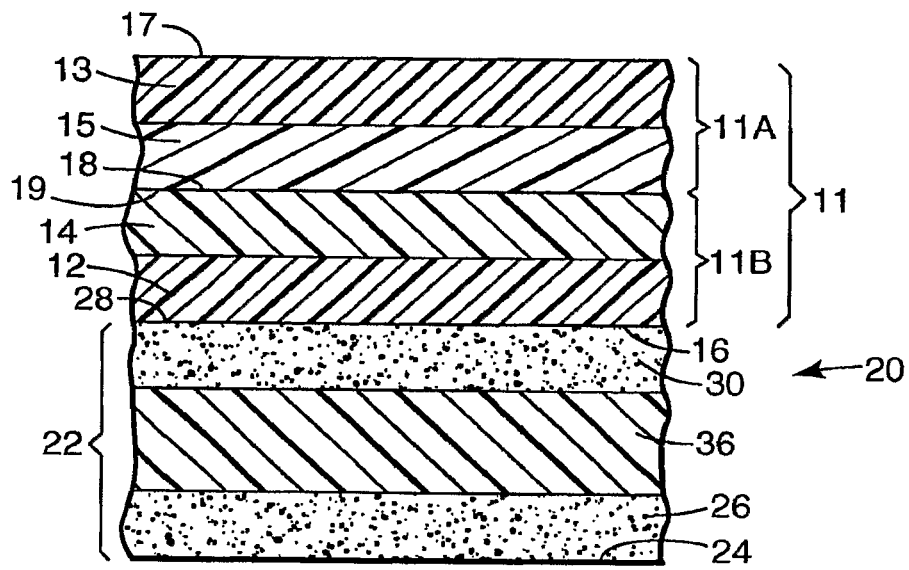
FIG. 1 is an enlarged cross-sectional view of a portion of one exemplary pressure sensitive adhesive tape assembly according to the present invention, with a double-sided pressure sensitive adhesive tape releasably adhered to a double-sided release liner that can be readily delaminated into two release layers.

Referring to FIG. 1, an exemplary delaminatable release liner 11 according to the present invention is made with at least two delaminatable portions 11A and 11B. In exemplary delaminatable release liner 11, outer delaminatable portion 11A comprises a first release layer 13 and a first backing layer 15. The layers 13 and 15 define a first major release surface 17 and a first back side surface 19 of delaminatable portion 11A, respectively. Inner delaminatable portion 11B comprises a second release layer 12 and a second backing layer 14. The layers 12 and 14 define a second major release surface 16 and a second back side surface 18 of delaminatable portion 11B, respectively. An adhesive tape assembly 20 can be made, according to the present invention, by forming delaminatable release liner 11, and releasably bonding delaminatable release liner 11 to an outer adhesive surface 28 of a double-sided adhesive tape 22. The tape 22 includes a front adhesive side or surface 24 defined by a PSA layer 26 of a pressure sensitive adhesive and a back adhesive side or surface 28 defined by a PSA layer 30 of the same or a different pressure sensitive adhesive. Delaminatable release liner 11 is in contact with, bonded to and readily removable from PSA layers 30 and 26 when in roll form (see, for example, FIG. 2).

Delaminatable release liner 11 is readily removable from tape 22 such that removal of delaminatable release liner 11 or a portion thereof (e.g., outer delaminatable portion 11A, inner delaminatable portion 11B, or both) does not cause significant damage to double-sided adhesive tape 22 (i.e., does not cause cohesive failure, substantial tearing or substantial permanent stretching of the tape). Typically, it is desirable for the bond strength between outer delaminatable portion 11A and inner delaminatable portion 11B to be less than the bond strength between inner delaminatable portion 11B and double-sided adhesive tape 22 such that outer delaminatable portion 11A is readily removable from inner delaminatable portion 11B without negatively impacting the bond between inner delaminatable portion 11B and double-sided adhesive tape 22. Further, it is typically desirable for the bond strength between outer delaminatable portion 11A and double-sided adhesive tape 22 (i.e., surface 24 of tape 22) to be less than the bond strength between outer delaminatable portion 11A and inner delaminatable portion 11B such that, when in roll form, outer delaminatable portion 11A releasably separates from double-sided adhesive tape 22 (i.e., surface 24 of tape 22) without negatively impacting the bond between outer delaminatable portion 11A and inner delaminatable portion 11B.

I. Adhesive Tape Assembly Components

As shown in FIG. 1, exemplary adhesive tape assembly 20 may comprise a number of individual layers. A description of possible layers and layer components is provided below.

A. Backing Layers

Adhesive tape assemblies of the present invention comprise a delaminatable release liner such as exemplary delaminatable release liner 11 of FIG. 1. Each delaminatable release liner comprises first and second backing layers such as first and second backing layers 15 and 14 shown in exemplary delaminatable release liner 11 of FIG. 1. Each backing layer typically comprises a film or foam material that may be formed from a variety of materials. The composition and structure (e.g., thickness) of each backing layer is chosen so as to provide sufficient tensile and tear strength to the backing layers so that the backing layers may be releasably removed from the adhesive tape assembly. Further, the composition and structure (e.g., surface features) of each backing layer is chosen so as to provide a desired degree of bond strength between back side surfaces of the first and second backing layers (i.e., back side surfaces 19 and 18 of first and second backing layers 15 and 14 respectively) without the need to chemically modify (i.e., apply a coating) either of the back side surfaces of the first and second backing layers. This bond strength is referred to herein as a "first bond strength" of the adhesive tape assembly.

Suitable materials for forming first and second backing layers 15 and 14 may vary depending on a number of factors including, but not limited to, a desired bond strength between first and second backing layers 15 and 14, the thickness of the first and second backing layers 15 and 14, desired release properties of the first and second backing layers 15 and 14, and release layer compositions when release layers are subsequently applied onto a major surface of the first and/or second backing layers 15 and 14. For example, suitable materials for forming second backing layer 14 include, but are not limited to, polyesters such as polyethylene terephthalate (PET); polyolefins such as polypropylene, polyethylene, propylene/ethylene copolymer, polyvinlyl chloride, and TPOs (thermoplastic olefins); any combination thereof; and multilayer films or foams containing any combination of the above-described materials, such as a laminate of a thermoplastic polyolefin (TPO) layer and a polyethylene layer.

Suitable materials for forming first backing layer 15 include, but are not limited to, a polyolefin such as a high density polyethylene, a medium density polyethylene, a low density polyethylene, a linear low density polyethylene, an ultra-low density polyethylene, a polypropylene, a thermoplastic polyolefin (TPO), and an ethylene vinyl acetate (EVA) copolymer; a polyester such as polyethylene terephthalate (PET) or a copolyester such as co-polyethylene terephthalate (PET); any combination thereof; and multilayer films or foams containing any combination of the above-described materials. High density polyethylenes have a typical density above about 0.96 g/cc; medium density polyethylenes have a typical density in the range from about 0.93 g/cc to about 0.94 g/cc; low density polyethylenes have a typical density in the range from about 0.90 g/cc to about 0.92 g/cc; and linear low and ultra low density polyethylenes have densities below about 0.90 g/cc. The polyethylenes can be made by any method including use of conventional catalysts as well as metallocene catalysts.

The materials for each layer are selected to provide the desired balance of bond strengths between the first and second backing layers and the bond strengths between each of the release surfaces and the adhesive surfaces to which they are respectively bonded to. The selection of materials can be based on the natural affinity that each of materials of each layer have for each other as well as the inherent modulus or stiffness of each of the materials, and the processing methods. It is desirable for the first and second backing layers to have sufficient adhesion to each other so that handling during subsequent processing will not cause the layers to prematurely delaminate. The amount of adhesion needed can vary depending upon the handling that occurs in these processes. For example, in one embodiment, a release liner with first and second backing layers may need sufficient adhesion so that a strip of liner measuring about 6 inches by about 24 inches, held under tension by hand, can be twisted about 180 degrees without delaminating the two layers.

The adhesion of materials that do not generally adhere well to each other, i.e., are chemically incompatible, can be increased by blending some of the material from one of the layers with the material of the other layer to improve the compatibility of the two materials. Compatible monomers may also be copolymerized with less compatible monomers to provide a copolymer layer that can adhere more tightly to another layer made from a layer of the less compatible monomer alone. For example, low density polyethylene may not adhere sufficiently when it is extrusion coated onto a layer made of a polymer of polypropylene, but it can adhere sufficiently to a thermoplastic olefin (a copolymer of polypropylene and polyethylene) to permit twisting of a strip of the release liner as described above.

An alternative method to control the bond strength between the layers is to select materials in which the melt temperature of the first backing layer, which is hot melt coated onto the second layer, is higher than the melt temperature of the second backing layer. Heat is needed to create a bond between the layers, but the amount of heat to laminate the layers together is generally not enough to melt both layers. By selecting one layer to have a lower melt temperature than the other, the lower melt temperature material can be hot melt coated onto the other layer without fusing to it. In one embodiment, a melt temperature difference of about 30° F. can be used. Other embodiments may have melt temperature differences of about 50° F., 100° F., or more. Embodiments having little or no melt temperature differences can be made to be delaminatable by using chemically incompatible compositions for the layers or controlling the temperature of lamination of the two layers.

It is desirable for each of the first and second backing layers 15 and 14 to have a layer thickness that provides enough tensile and/or tear strength so that the first and second backing layers 15 and 14 may be removed from the adhesive tape assembly without tearing the first or second backing layer. Typically, each of the first and second backing layers 15 and 14 has a layer thickness of up to about 50 mils (1.27 mm), and most typically, has a layer thickness ranging from about 1.0 mil (25 μm) to about 10 mils (0.25 mm). In one exemplary embodiment of the present invention, the first backing layer 15 has a layer thickness ranging from about 1.0 mil (25 μm) to about 5 mils (0.13 mm), while the second backing layer 14 has a layer thickness ranging from about 1.0 mil (25 μm) to about 10 mils (0.25 mm). In a further exemplary embodiment, the first backing layer 15 has a layer thickness ranging of about 1.5 mil (38 μm), and the second backing layer 14 has a layer thickness ranging of about 5 mils (0.13 mm).

Each of the first and second backing layers 15 and 14 may comprise one or more of the above-described films or foams with or without further surface treatments to alter an outer surface of the film or foam. In one desired embodiment of the present invention, one or both major outer surfaces of either or both of the first and second backing layers 15 and 14 is corona treated so as to provide a surface energy of at least about 30 dynes. Corona treatment and other surface treatments suitable for use in the present invention include, but are not limited to surface treatments disclosed in U.S. Pat. No. 4,822,451, the disclosure of which is incorporated herein by reference in its entirety. Such surface treatments may be used to enhance (i) surface bonding between first backing layer 14 and second backing layer 15 and/or (ii) surface bonding between a backing layer and a subsequently applied layer, such as a release layer described below (e.g., a silicone release material).

Each of the first and second backing layers 15 and 14 comprises a back side major surface (e.g., surface 18 of second backing layer 14 and surface 19 of first backing layer 15) that is typically in contact with, bonded to and readily removable from the other surface as shown in FIG. 1. As discussed above, the degree of bonding between surface 18 of second backing layer 14 and surface 19 of first backing layer 15 may vary depending on the materials used to form second backing layer 14 and first backing layer 15. Typically, second backing layer 14 and first backing layer 15 comprise materials so as to provide a first bond strength between second backing layer 14 and first backing layer 15 of at least about 1.0 and up to about 200 g/inch using the 90 Degree Peel Adhesion Test Method described below. In one desired embodiment, second backing layer 14 and first backing layer 15 comprise materials so as to provide a first bond strength between second backing layer 14 and first backing layer 15 of at least about 10 g/inch. It is desirable for second backing layer 14 and first backing layer 15 to have the above-mentioned first bond strength therebetween without the aid of additional surface treatments and/or layers between the second backing layer 14 and first backing layer 15. In other words, it is desirable for the second backing layer 14 and first backing layer 15 to have the above-described first bond strength between surface 18 of second backing layer 14 and surface 19 of first backing layer 15.

It is also desirable for surface 18 of second backing layer 14 and surface 19 of first backing layer 15 to be substantially free of silicone release material or any other material that would prevent attachment of a tab to the back side surface (i.e., surface 18 and/or 19) as described below.

The selection of materials for forming second backing layer 14 and first backing layer 15 may also take into account the melting points of the materials in second backing layer 14 and first backing layer 15. In one exemplary embodiment of the present invention, the first backing layer 15 has a first melting point and the second backing layer has a second melting point, wherein the second melting point is at least 10° C. (50° F.) greater than the first melting point. In a further exemplary embodiment of the present invention, the second melting point is at least 37.8° C. (100° F.) greater than the first melting point.

In one exemplary embodiment of the present invention, second backing layer 14 (or first backing layer 15) comprises a heat resistant film material that can withstand post-formation processing temperatures (i.e., temperatures exposed to during a given application) of up to about 175° C. Such a construction is desirable when first backing layer 15 (or second backing layer 14) is extruded onto second backing layer 14 (or first backing layer 15) during the process of preparing exemplary delaminatable release liner 11. Such a construction is desirable for applications wherein a heat-bondable tab is bonded to a major outer surface of second backing layer 14 (or first backing layer 15) as described below. Second backing layer 14 and first backing layer 15 may have a melting point that varies depending on a given application. Typically, second backing layer 14 has a melting point of at least about 130° C., while first backing layer 15 has a melting point of at least about 90° C.

In a further exemplary embodiment of the present invention, first backing layer 15 comprises a low density polyethylene (LDPE), and second backing layer 14 comprises a multilayer structure having three distinct layers, wherein the three distinct layers comprise first and second clear outer layers of thermoplastic polyolefin, and an intermediate layer of thermoplastic polyolefin containing a colorant positioned between the first and second clear outer layers. Suitable colorants include, but are not limited to, pigments (e.g., carbon black), dyes, or any combination thereof.

B. Release Layers

The delaminatable release liners may further comprise two major outermost release surfaces, typically in the form of release layers such as release layers 12 and 13 shown in exemplary delaminatable release liner 11 of FIG. 1. Release layers 12 and 13 may each comprise any material suitable for functioning as release layers and remaining integral with their respective backing layers 14 and 15. Each of the release layers 12 and 13 may comprise release material in the form of a continuous or discontinuous (e.g., patterned) coating or layer that is intended to contact, bond to and be readily removable from one of the PSA layers of the double-side PSA tape 22. The release material can be coated onto, extruded as part of, laminated as part of, or otherwise provided to form surfaces 16 and 17 of release layers 12 and 13 respectively.

In another embodiment, materials for first and second backing layers 14 and 15 are selected such that they are delaminatable from each other and each of the layers has outer exposed surfaces 16 and 18 that have sufficient release properties from a double sided pressure sensitive adhesive tape without requiring separate release layers. For example, a release liner having a low density polyethylene backing layer and a suitable thermoplastic olefin backing layer can be used with double coated tapes having acrylic pressure sensitive adhesives having low to moderate tackiness.

Suitable release materials include, but are not limited to, polyolefins, silicones, fluorocarbons, low adhesive backsizes (e.g., those made for polyureas, polyurethanes, polyacrylates, etc.), perfluoroether, and combinations thereof. General knowledge in the art can be used to help in the selection of the release material for a certain pressure-sensitive adhesive. For example, a polyacrylate PSA can be used with release materials made from polyolefins, silicones, and fluorocarbons. A tackified block copolymer PSA can be used with polyurea or polyurethane backsizes as well as silicones and fluorocarbons.

It can be desirable for the release material of each release layer in contact with a high bond strength pressure sensitive adhesive (described below) to comprise at least one of a silicone and a fluorocarbon, and may also include a low adhesive backsize, and blends or combinations thereof, in an effort to ensure that the delaminatable release liner is readily removable from such a high bond strength PSA. These release materials are typically in an amount and of a nature that prevents a polymeric tab, such as that described below and made from a polyamide, PE, PP, EVA, TPO or PE/PP, from being sufficiently heat bondable to a release side of the delaminatable release liner to consistently allow the delaminatable release liner to be removed by pulling on the tab (i.e., the tab pulls off before the delaminatable release liner is removed).

Release layers 12 and 13 may comprise the same release material or may comprise different release materials. In one exemplary embodiment of the present invention, each of release layers 12 and 13 comprise a silicone, a fluorocarbon, a low adhesive backsize, or a blend or combination thereof. In a further exemplary embodiment, each of release layers 12 and 13 comprise a silicone release material. For example, release layer 12 may comprise a curable epoxy-silicone component such as a photocurable cycloaliphatic epoxy functional dimethylsilicone polymer commercially available under the trade designation GE UV9430 from GE Silicones (Wilton, Conn.), an epoxy-functional linear polydimethylsiloxane copolymer commercially available under the trade designation GE UV9315 from GE Silicones (Wilton, Conn.), or a combination thereof. Release layer 13 may comprise a silicone resin such as a silanol terminated polydimethylsiloxane resin commercially available under the trade designation GELEST DMS S12 from Gelest, Inc. (Morrisville, Pa.).

The degree of bonding between major release surfaces 16 and 17 of release layers 12 and 13 respectively and adjacent adhesive surfaces (i.e., adhesive surfaces 28 and 24) may vary depending on the materials used to form release layers 12 and 13, as well as the PSAs used to form adhesive layers 26 and 30. As used herein, the term "second bond strength" is used to refer to the bond strength between the major release surface 17 and front adhesive side 24 of adhesive tape assembly 20, while the term "third bond strength" is used to refer to the bond strength between the major release surface 16 and back adhesive side 28 of adhesive tape assembly 20. Typically, release layers 12 and 13 comprise materials so as to provide a second bond strength between major release surface 17 and front adhesive side 24 and a third bond strength between major release surface 16 and back adhesive side 28 of at least about 5.0 and up to about 200 g/inch using the 90 Degree Peel Adhesion test. In one desired embodiment, release layers 12 and 13 comprise materials so as to provide a second bond strength between major release surface 17 and front adhesive side 24 and a third bond strength between major release surface 16 and back adhesive side 28 of at least about 7.0 g/inch using the 90 Degree Peel Adhesion test.

It is desirable for second bond strength between first major release surface 17 and front adhesive side 24 to be lower than first bond strength between first back side surface 19 and second back side surface 18 so that when adhesive tape assembly 20 is in roll form, front adhesive side 24 separates from release surface 17 such that delaminatable liner 11 is on one side of adhesive tape 22. Further, it is desirable for first bond strength between first back side surface 19 and second back side surface 18 to be lower than third bond strength between second major release surface 16 and back adhesive side 28 so that delaminatable portion 11A can be removed from delaminatable portion 11B without negatively impacting the bond between second major release surface 16 and back adhesive side 28.

As discussed above, it is desirable for the first bond strength between outer delaminatable portion 11A and inner delaminatable portion 11B (i.e., between surface 18 of second backing layer 14 and surface 19 of first backing layer 15) to be less than the third bond strength between inner delaminatable portion 11B (i.e., release surface 16 of release layer 12) and double-sided adhesive tape 22 (i.e., adhesive surface 28 of adhesive layer 30) such that outer delaminatable portion 11A is readily removable from inner delaminatable portion 11B without negatively impacting the bond between inner delaminatable portion 11B and double-sided adhesive tape 22. Further, as discussed above, it is typically desirable for the second bond strength between outer delaminatable portion 11A (i.e., release surface 17 of release layer 13) and double-sided adhesive tape 22 (i.e., surface 24 of tape 22) to be less than the first bond strength between outer delaminatable portion 11A and inner delaminatable portion 11B (i.e., between surface 18 of second backing layer 14 and surface 19 of first backing layer 15) such that, when in roll form, outer delaminatable portion 11A (i.e., release surface 17 of release layer 13) releasably separates from double-sided adhesive tape 22 (i.e., surface 24 of tape 22) without negatively impacting the bond between outer delaminatable portion 11A and inner delaminatable portion 11B.

In one desired embodiment of the present invention, the third bond strength between release layer 12 and adjacent PSA layer 30 is at least about 10 and up to about 200 g/inch using the 90 degree adhesion test, while the second bond strength between release layer 13 and adjacent PSA layer 26 is at least about 5.0 and up to about 100 inch using the same test. The first bond strength in this embodiment can be from about 4 to 12 g/inch. While ranges can overlap, each specific embodiment would desirably have a second bond strength less than the first bond strength, and the first bond strength less than the third bond strength. In another desired embodiment, the second bond strength is between about 6 to about 7 g/inch, the first bond strength is between about 10 and about 20 g/inch, and the third bond strength is between about 40 and about 60 g/inch using the 90 degree adhesion test. In one desired embodiment, the third bond strength between release layer 12 and adjacent PSA layer 30 is about 50 g/inch, the second bond strength between release layer 13 and adjacent PSA layer 26 is about 7.0 g/inch, and the first bond strength between second backing layer 14 and first backing layer 15 is about 10 g/inch using the 90 degree adhesion test.

C. Optional Intermediate Layers

It can be desirable in some embodiments for either or both of delaminatable portions 11A and 11B to include an optional intermediate support layer (not shown) disposed between the backing layers 14 and 15 and release layers 12 and 13, respectively, to provide additional structural support to delaminatable portions 11A and 11B. Such additional support can be desirable, for example, in order to facilitate separation of delaminatable portions 11A and/or 11B from adhesive tape 22. By making either or both of delaminatable portions 11A and 11B stiffer than adhesive tape 22, with the addition of a suitable intermediate layer, it is usually easier to separate delaminatable portions 11A and 11B from adhesive tape 22. The intermediate layer may be a substantially continuous film, e.g., an extruded or solvent coated film, or may be a web, e.g., a non-woven, knit, woven, or other web, that has one or more holes or perforations therein, such as that disclosed in U.S. Pat. No. 5,167,995, which is incorporated herein by reference in its entirety. Satisfactory results can be obtained with an intermediate layer for delaminatable portions 11A and/or 11B comprising a high density polyethylene ("HDPE") or a medium density polyethylene ("MDPE").

D. Adhesive Tape Layers

The above-described delaminatable release liners are suitable for use with any double-sided pressure-sensitive adhesive (PSA) tape, and are particularly useful when the PSA tape includes at least one high bond strength PSA. Examples of such tapes include an adhesive transfer tape that is a single layer of pressure-sensitive adhesive or a double coated tape that may or may not include a backing layer between two or more layers of pressure-sensitive adhesive. The double coated tape may have only two layers of pressure-sensitive adhesive adhered to each other to form the tape. The adhesives on each major surface can be the same or they may be different as might be the case if the adhesives were formulated to adhere to two substrates together with the substrates having different types of surfaces, e.g., a high energy surface such as a metal surface to a low energy surface such as a polyolefin surface. The double coated tape may include an intermediate layer (e.g., intermediate layer 36 shown in FIG. 1) between the two adhesives. This layer may be any suitable structure for a tape backing. Examples of such structures include, but are not limited to, a polymeric film, a polymeric foam, a metal foil, a paper, a nonwoven fabric, a woven fabric, a ceramic woven or nonwoven cloth, and the like. Suitable polymeric films can include biaxially oriented polyester, biaxially oriented polypropylene, mono-axially oriented polypropylene, and the like. Suitable polymeric foams include polyethylene foams, polyurethane foams, polyacrylate foams, neoprene foams, and the like.

The present invention contemplates the use of any suitable PSA in the practice of the invention. PSAs are generally known in the art and include, but are not limited to, polyacrylate polymers and copolymers, polyurethanes, ethylene vinyl acetate copolymers, natural rubber, block copolymers, and the like. The adhesives may include tackifiers and plasticizers as needed to provide the desired adhesive and modulus properties for the end use of the tape.

The adhesives may be formed by bulk polymerization, solvent polymerization, emulsion polymerization, etc. and can be cross-linked or left uncrosslinked. Cross-linking may be accomplished by various means known by those skilled in the art such as chemical cross-linking, thermal cross-linking, radiation cross-linking, and combinations thereof.

The pressure sensitive adhesive for one or both of adhesive layers 26 and 30 of exemplary tape 22 can be a high bond strength PSA that exhibits a bond strength, or requires a removal force, of greater than about 30 ounces per inch (336 g/cm) after being bonded to a polyolefin surface (e.g., a polyolefin like polyethylene, and especially a low density polyethylene), and removed from the polyolefin surface at a removal rate of about 12 inches per minute (30 cm/min). High bond strength PSAs can also be characterized as those that exhibit a bond strength, or require a removal force, of at least about 2.0 pounds per inch (357 g/cm), and in some cases at least about 10.0 lbs./in (1.78 Kg/cm), after being bonded to a low density polyethylene (LDPE) surface for at least 24 hours and removed from the LDPE surface at a removal rate of about 12 inches per minute (30 cm/min). Such high bond strength pressure sensitive adhesives can be obtained, for example, using the processes and compositions described in PCT Patent Publication No. WO 00/06637 (PCT Application No. US 99/17344, filed Jul. 30, 1999) and U.S. Pat. No. 6,103,152, which are both incorporated herein by reference in their entirety. Other PSAs that may be suitable for use in the adhesive tape of the present inventive tape assembly can be found in PCT Patent Publication No. WO 01/57151 (PCT Application No. 2001/02976, filed Jan. 30, 2001), U.S. Pat. No. 6,630,531, and U.S. Published Patent Application No. 2004/0229000, which are all incorporated herein by reference in their entirety.

In order to make it even easier for a portion of the delaminatable release liner (e.g., delaminatable portion 11A) to be removed from a PSA layer of adhesive tape 22 (e.g., layer 26), and thereby facilitate the process of using the remaining tape assembly even further (i.e., adhesive tape assembly 20 without delaminatable portion 11A), it can be desirable for the release material to be chosen such that the strength of the bond between the PSA layer and the adjacent release layer is no more than about 1.0 oz/in (11.2 g/cm). When the adhesive layer comprises a high bond strength PSA, like those described above, it is desirable to use a silicone or similar release material in both release layers (e.g., release layers 12 and 13) of the delaminatable release liner in order to obtain such low liner release forces.

The PSA layer 26 can be supplied on its own release liner and subsequently bonded to PSA layer 30 (or intermediate layer 36) depending on the tape construction desired. Alternatively, PSA layer 30 can be similarly supplied. It can be desirable for at least one of the pressure sensitive adhesive layers 26 and 30 to be readily bondable to surfaces of a wide range of materials including, for example, metal materials, ceramic materials, and/or polymeric materials. Polymeric materials may include thermoset and thermoplastic plastic materials such as, for example, those used to make automotive exterior trim parts such as body side moldings and claddings used on the sides of automobile bodies, as well as to make other plastic articles. It may also be desirable for at least one of the pressure sensitive adhesive layers 26 and 30 to be readily bondable to surfaces of a wide range of thermoset and thermoplastic olefinic elastomers such as, for example, SANTOPRENE (manufactured by Monsanto, St. Louis, Mo.), ethylene propylene diene monomer (EPDM), polypropylene, high density polyethylene and low density polyethylene. An adhesion promoter (e.g., 3M 4298UV Adhesion Promoter manufactured by 3M Company, St. Paul, Minn.) can be used to promote the bonding of the PSA to such elastomeric materials. Elastomeric materials have been used, for example, to make weatherstrip for sealing automobile doors and windows, as well as to make other elastomeric articles.

Figure 2:
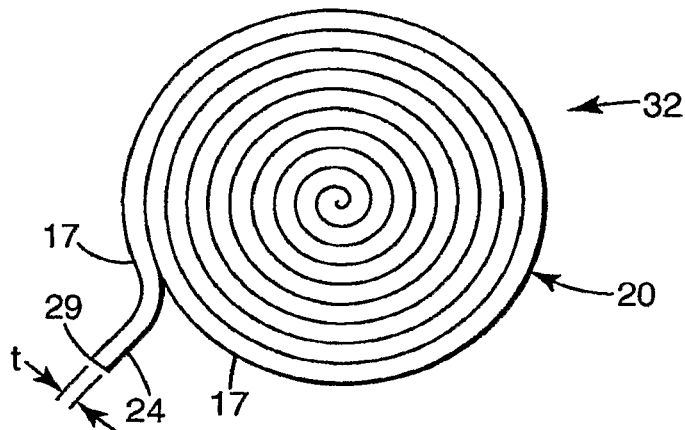
FIG. 2 is a side view of the tape assembly of FIG. 1 in roll form.

Referring to FIG. 2, adhesive surface 24 of PSA layer 26 contacts first major release surface 17 of first release layer 13 when adhesive tape assembly 20 is wound into a roll 32. Roll 32 exhibits a desired level of roll stability due to (1) the bond strength between adhesive surface 24 of PSA layer 26 and first release surface 17 of first release layer 13, (2) the bond strength between surface 19 of first backing layer 15 and surface 18 of second backing layer 14, and (3) the bond strength between second release surface 16 of second release layer 12 and adhesive surface 28 of PSA layer 30.

Planetary rolls of a double-sided PSA tape assembly having two liners that are made with a tape having a thickness of at least about 15 mils or more (e.g., typically foam tapes) can be particularly prone to roll instability problems, because the rolls tend to be larger in diameter compared to tape assemblies with thinner tapes, in order to provide the same length of tape on a single roll. Such tape assemblies that are narrow in width can be even more likely to exhibit roll instability. The adhesive tape assemblies of the present invention are less likely to exhibit roll instability, even when comparable lengths of the tape assembly are relatively narrow in width and the adhesive tape has a thickness of at least about 15 mils or more.

Figure 3:
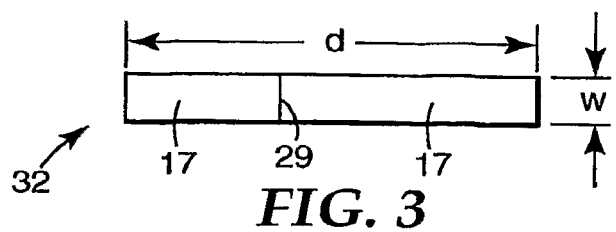
FIG. 3 is a top view of the tape assembly of FIG. 1 in roll form.
Figure 4:
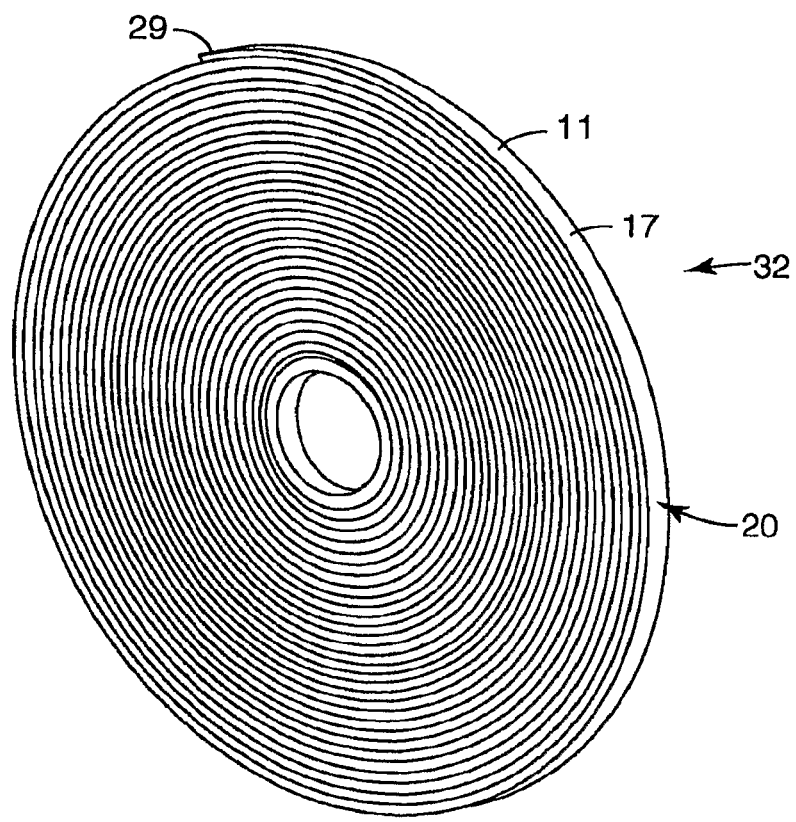
FIG. 4 is a perspective view of the tape assembly of FIG. 1 in roll form.

Referring to FIGS. 2-4, when the adhesive tape assembly 20 has an overall thickness, t, of about 0.052 inches (0.132 cm) and is wound into a roll 32 having tape end 29, with adhesive surface 24 of PSA layer 26 in contact with first release surface 17 of first release layer 13, the roll can exhibit roll stability (i.e., the coils forming the roll 32 do not substantially telescope or fall apart when the roll 32 is held suspended along its outer circumferential edge) even when the roll 32 has a diameter d that is at least about 20 times the width w of the adhesive tape assembly 20. This is the minimum diameter to width ratio at which roll stability problems have been experienced with rolls of prior adhesive tape assemblies comprising a double-sided adhesive tape, with a first PSA side and a second PSA side, and a release liner releasably bonded to each PSA side.

An example of an adhesive tape assembly 20 that can be used to form a narrow roll 32 according to the present invention, has a width w of up to about 1 inch (2.54 cm), a thickness of about 0.052 inches (0.132 cm) and a length in the range of from about 36 yards (33 m) to about 144 yards (132 m) and, it is believed, even longer (i.e., a diameter to width ratio ranging from about 20 to about 70). For many applications, the present adhesive tape assemblies will have a width w of up to about 0.5 inches (1.27 cm), a thickness of about 0.052 inches (0.132 cm) and a length in the range of from about 36 yards (33 m) to about 144 yards (132 m) and, it is believed, even longer (i.e., a diameter to width ratio ranging from about 20 to about 70).

E. Optional Tab Component

In some embodiments of the present invention, an optional tab may be attached to a back side surface (e.g., back side surface 18, 19, or both 18 and 19) of at least one of backing layers 14 and 15 to facilitate separation of a portion of the delaminatable liner (e.g., delaminatable portions 11B) from adhesive tape 22 and/or separation of a portion of the delaminatable liner (e.g., delaminatable portions 11A) from another portion of the delaminatable liner (e.g., delaminatable portions 11B). An exemplary embodiment using a tab is shown in FIG. 5.

Figure 5:
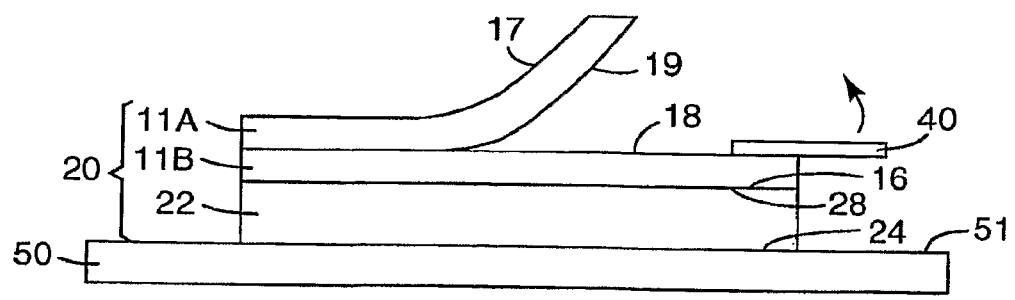
FIG. 5 is an enlarged cross-sectioned view of the tape assembly of FIG. 1 permanently adhered to a substrate, with a liner removal tab bonded to an exposed surface of an inner portion of the delaminated release liner so as to facilitate the removal of the inner portion of the delaminated release liner from the pressure sensitive tape, according to the present invention.

As shown in FIG. 5, exemplary adhesive tape assembly 20 is attached to substrate 50 such that front adhesive surface 24 is permanently adhered to surface 51 of substrate 50. Delaminatable portion 11A is shown in a partially removed position so that first and second back side surfaces 19 and 18 of delaminatable portion 11A and delaminatable portion 11B are exposed. (Although not shown in FIG. 5, a second tab may be attached to first back side surface 19 of delaminatable portion 11A prior to or during formation of delaminatable liner 11 and be used to separate delaminatable portion 11A from delaminatable portion 11B so as to put delaminatable portion 11A in the partially removed position as shown.) In this exemplary embodiment, tab 40 is attached to second back side surface 18 of delaminatable portion 11B. Typically, tab 40 is heat-bonded to a given back side surface. Once attached, tab 40 can be used to facilitate removal of delaminatable portion 11B from back adhesive surface 28 of adhesive tape 22. As discussed above, second major release surface 16 of delaminatable portion 11B is formulated so that removal of delaminatable portion 11B does not cause significant damage to double-sided adhesive tape 22 (i.e., does not cause cohesive failure, substantial tearing or substantial permanent stretching of the tape).

Tab 40 can comprise at least one of a polyamide, polypropylene, polyethylene, ethylene vinyl acetate, polyester, thermoplastic polyolefin (TPO), copolymer of polyethylene and polypropylene, and combinations thereof. Tab 40 is operatively adapted (e.g., dimensioned and formulated) for being heat bonded to second back side surface 18 of second back side layer 14 (or first back side surface 19 of first back side layer 15) so as to allow delaminatable portion 11B (or delaminatable portion 11A) of delaminatable release liner 11 to be removed from adhesive tape 22 by pulling on the tab 40 in the direction shown by the arrow in FIG. 5. Such a tab 40 is intended to make it easier for delaminatable portion 11B (or delaminatable portion 11A) of delaminatable release liner 11 to be removed. Suitable materials for tab 40, intended to be heat bonded to a PE, PP, TPO or PE/PP second back side layer 14 (or first back side layer 15), can include polyamides, PEs, PPs, TPOs, EVAs, and PE/PPs. Suitable materials for tab 40 intended to be heat bonded to a PP second back side layer 14 (or first back side layer 15) can include polyamides, TPOs, PPs, and PE/PPs. Suitable materials for tab 40 to be heat bonded to a polyester second back side layer 14 (or first back side layer 15) can include polyesters, co-polyesters, polyamides and polyimides.

A tab may also be formed from a tape having a backing coated with a suitable pressure-sensitive adhesive, wherein the pressure-sensitive adhesive has a sufficient bond strength to the layer of material to be removed so that when the tab is applied to the surface of the layer and pulled, the appropriate layer separates from the tape assembly. Suitable backing materials have a tensile strength greater than the bond strength needed to remove the layer. Examples of suitable materials include polyesters, polypropylene, biaxially oriented polypropylene, paper, polyamides, and the like. Pressure-sensitive adhesives can be selected to bond well to the layer to be removed. Suitable adhesives include acrylic adhesives, tackified block copolymer adhesives, silicone adhesives, and the like.

III. Methods of Making Adhesive Tape Assemblies

The adhesive tape assemblies of the present invention can be formed by a variety of conventional process steps. For example, backing layers 14 and 15 may be co-extruding to form separable portion of the delaminatable release liner. Alternatively, backing layers 14 and 15 can be formed by extruding one of the layers (e.g., first backing layer 15) onto the other layer (e.g., second backing layer 14) or vice versa. In either case conventional commercially available extruders and techniques well known in the art can be used. For example, conventional blown film extrusion equipment and techniques can be used to simultaneously co-extrude two or more layers (e.g., layers 14 and 15). Extruders force their corresponding layers through a common die. In this way, the various layers can be laminated together simultaneously as they are formed. In blown film extrusion, the laminated layers are extruded into the form of a tube. The tube is then collapsed, rolled flat and the edges trimmed to form backing layers 14 and 15. Backing layers 14 and 15 are then optionally coated with a release layer as described above, and then subsequently laminated to a double sided adhesive tape 22 to form a tape assembly 20. In the case where the release material includes silicone or fluorocarbon, for example, the release material may be applied as a solvent based coating, a water based coating, or a 100% solids coating (i.e., the solids are in liquid form without a solvent) onto backing layers 14 and 15.

IV. Methods of Using Adhesive Tape Assemblies

The present invention is further directed to methods of using the above-described adhesive tape assemblies. In one exemplary embodiment, a method of using an adhesive tape assembly comprises applying a double-sided pressure sensitive adhesive tape to one or more surfaces, wherein the method comprises (1) providing an adhesive tape assembly, wherein the adhesive tape assembly comprises a double-sided adhesive tape comprising front and back adhesive sides, each of the adhesive sides comprising a pressure sensitive adhesive; and a delaminatable release liner in contact with, bonded to and readily removable from the back adhesive side of the double-sided adhesive tape, the delaminatable release liner comprising a first major release surface on one side of the release liner, a second major release surface on an opposite side of the release liner, and a plane of weakness between the first and second major release surfaces, wherein the release liner can be readily delaminated lengthwise along the plane of weakness, between the first and second major release surfaces, so as to form a first delaminated layer and a second delaminated layer, with the first delaminated layer comprising the first major release surface and a first back side surface opposite the first major release surface, and the second delaminated layer comprising the second major release surface and a second back side surface opposite the second major release surface, wherein the second major release surface is in contact with, bonded to and readily removable from the back adhesive side, and at least a portion of the first major release surface is exposed; (2) applying the front adhesive side of the adhesive tape to a first substrate; (3) at least partially removing the first delaminated layer by separating the first delaminated layer from the second delaminated layer; and (4) bonding a tab to the second back side surface of the second delaminated layer, such that the second delaminated layer can be removed from the tape by pulling on the tab.

In the above exemplary method, the adhesive tape assembly may be in roll form (see FIG. 2). When the adhesive tape assembly is in roll form, the above exemplary method further comprises unwinding the roll to expose the front adhesive side of the adhesive tape. The above exemplary method may further comprise one or more processing steps once the first delaminated layer (e.g., delaminatable portion 11A) is removed from the second back side surface of the second delaminated layer (e.g., delaminatable portion 11B), and a tab is attached to the second delaminated layer (e.g., delaminatable portion 11B). For example, the method may further comprise the step of applying paint onto the first substrate and the second back side surface of the second delaminated layer. After any optional processing steps, the method may further comprise the step of pulling the tab to remove the second delaminated layer (e.g., delaminatable portion 11B) from the adhesive tape assembly to expose the pressure sensitive adhesive of the back adhesive side. The exposed pressure sensitive adhesive of the back adhesive side may be brought into contact with a second substrate so that the adhesive tape is positioned between the first substrate and the second substrate. In one exemplary embodiment, the first substrate comprises an elastomeric article, and the second substrate comprises a painted or unpainted surface of a vehicle.

Figure 6:
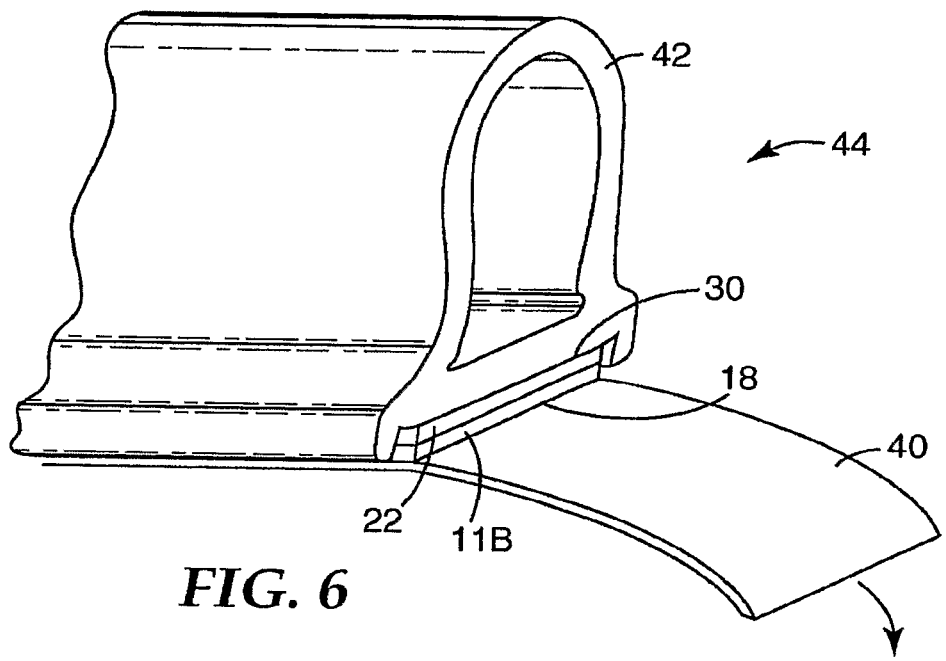
FIG. 6 is perspective view of a heat bond tabbed tape assembly, according to the present invention, with one PSA layer of the tape assembly permanently adhered to a substrate.

A further use of the adhesive tape assemblies of the present invention is depicted in FIG. 6. Referring to FIG. 6, an article assembly 44 of the present invention includes adhesive tape 22 bonded via front adhesive side 24 to, for example, a plastic or elastomeric article 42 (e.g., an automotive exterior trim part, such as body side moldings and claddings used on the sides of automobile bodies, and the like; a weatherstrip for sealing automobile doors and windows, and the like; as well as other plastic and elastomeric containing articles), with delaminatable portion 11B (e.g., second release layer 12 and second backing layer 14) being releasably bonded to back adhesive side 28 of tape 22. A tab 40 is bonded to back side surface 18 of second backing layer 14. It is preferable that back side surface 18 of second backing layer 14 be substantially free of a release material such as, for example, silicone that can prevent or at least significantly inhibit the bonding of tab 40 to back side surface 18 of second backing layer 14. The bond between tab 40 and second backing layer 14 should be strong enough to allow delaminatable portion 11B of delaminatable release liner 11 to be removed from adhesive tape 22 by pulling on tab 40 in the direction shown by the arrow in FIG. 6. It can also be preferable for the back side (i.e., back side surface 19) of first backing layer 15 to be similarly free of such a release material, especially if a tab 40 is intended to be bonded to back side surface 19 of first backing layer 15. Such a use of a tab 40 (i.e., bonded to back side surface 19 and/or 18) can enable the corresponding delaminatable portion (i.e., delaminatable portion 11A and/or 11B, respectively) to be more easily removed.

FIG. 6 shows article 42 after delaminatable portion 11A of delaminatable release liner 11 has been removed from delaminatable portion 11B and separated from adhesive side 24 of adhesive tape 22. Alternatively, roll 32 can be unwound such that back side 28 of adhesive tape 22 is exposed (i.e., first release surface 17 of first release layer 13 is still in contact with front adhesive surface 24 of PSA layer 26 after unwounding roll 32). In this alternative embodiment, delaminatable portion 11B of delaminatable release liner 11 can be removed first after bonding back side 28 of adhesive tape 22 to article 42. With such an application, it may be desirable to bond a tab 40 to back side surface 19 of first backing layer 15 to assist in the removal of delaminatable portion 11A from adhesive tape 22 as described above.

EXAMPLES

The following test methods were used in the Examples below.

90 Degree Peel Adhesion Test Method:

A one inch (2.5 cm) wide by 6 inch (15 cm) long sample is cut from a sample adhesive tape assembly or from a piece of the liner. The test is performed at a 90 degree angle using an Instron tensile tester with a jaw separation speed of 12 inches per minute.

Sample Preparation for Liner:

The outer surface of second layer 16 is laminated to an anodized aluminum panel having a thickness of about 0.127 mm using an acrylic pressure-sensitive adhesive tape and rolled down with a 6.8 kg metal roller. The first backing layer 15 is separated from second backing layer 14 manually (i.e., with a fingernail or razor blade) to start the delamination. Approximately 2.5 cm of the first backing layer is delaminated. The delaminated portion of the backing is placed in the upper jaw of the tensile tester and the panel is positioned horizontally in a fixture on the lower jaw. The average peel force for five test samples is recorded.

Sample Preparation for Tape:

A strip of tape is adhered to a 0.127 mm thick anodized aluminum panel and rolled down with a 6.8 kg roller. After allowing the test tape to dwell in contact with the liner for 72 hours at room temperature, the panel is positioned in the tensile tester as described above with all of the layers of the release liner clamped together in the upper jaw. Linear release was measured as an average peel force using an integrated average over 5 seconds test time.

Example 1

A 3-layer thermoplastic olefin (TPO) film was prepared by coextruding three layers of TPO (FLEXATHENE™ TP38NC01X01 thermoplastic polyolefin available from Equistar Chemicals, LP, Houston, Tex.) on a blown film extruder. The film had a total thickness of about 5 mils (0.127 mm) with the middle layer containing a red pigment while the outer layers were essentially clear. Each of the layers was about 1.5 mils.

A 1 mil (0.025 mm) low density polyethylene (LDPE) film was prepared by extruding LDPE (PETROTHENE™ 951 low density polyethylene available from Equistar Chemicals, LP, Houston Tex.) on a blown film extruder.

The blown films were converted into flat films and laminated to each other by extruding 0.5 mil (0.012 mm) LDPE (PETROTHENE™ 951 low density polyethylene) onto the 5 mil TPO film and laminating the 1 mil LDPE film to it using a nip roll. During extrusion, the molten LDPE fuses to the LDPE film while adhering delaminatably to the TPO film. The resulting laminate is a suitable delaminatable release liner for an acrylic pressure-sensitive adhesive tape such as Acrylic Foam Tape 4220 available from 3M Company, St. Paul Minn.

Example 2

The release liner of Example 1 was corona treated to a surface energy of at least about 30 dynes. A silicone coating prepared according to U.S. Pat. No. 6,835,422, the subject matter which is hereby incorporated by reference in its entirety, was coated onto the polyethylene surface of the release liner. The liner is a suitable release liner for a strippable tape.

Example 3

The silicone coated release liner of Example 2 was coated with a UV curable epoxy silicone release material. The composition contained 40 parts UV9430 epoxy silicone, 60 parts UV9315 epoxy silicone, and 2 parts of UV9380C Photocatalyst. All of the components are available from GE Silicones, Waterford, N.Y.

Example 4

A delaminatable release liner is prepared according to the method of Example 1. During the lamination of the LDPE film to the TPO film a 1 inch wide strip of 0.0.13 mm (0.5 mil) thick polymethylmethacrylate (PMMA) film is placed across the TPO film so that the LDPE extrudate and LDPE film are laminated over the PMMA strip. After lamination, the film laminate is rolled into a stock roll with the PMMA film strip approximately 20 feet into the roll. The stock roll is optionally coated on one or both sides with a release material (e.g., silicones of Examples 2 and 3) and then laminated to a double coated tape to form a tape stock roll. The tape stock roll is then slit into narrower, e.g., 1 cm, rolls of approximately 20 feet in length. The section of the PMMA strip on each roll forms a tab that may be used to start the delamination of the polyethylene release layer during further processing.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows and equivalents thereof.

What is claimed is:

1. An adhesive tape assembly comprising:
 a double-sided adhesive tape comprising front and back adhesive sides, each of said adhesive sides comprising a pressure sensitive adhesive;
 a substrate, wherein said front adhesive side of said double-sided adhesive tape is permanently bonded to a surface of said substrate; and
 a delaminatable release liner in contact with, bonded to and readily removable from said back adhesive side of said double-sided adhesive tape, said delaminatable release liner comprising:
 a first major release surface on one side of said release liner, a second major release surface on an opposite side of said release liner, and a plane of weakness between said first and second major release surfaces, wherein said release liner can be readily delaminated lengthwise along said plane of weakness, between said first and second major release surfaces, so as to form a first delaminated layer and a second delaminated layer, with said first delaminated layer comprising said first major release surface and a first back side surface opposite said first major release surface, and said second delaminated layer comprising said second major release surface and a second back side surface opposite said second major release surface, wherein said second major release surface is in contact with, bonded to and readily removable from said back adhesive side, and said first major release surface is exposed.

2. The adhesive tape assembly as set forth in claim 1, wherein said release liner comprises a first backing layer and a second backing layer, which respectively form the first delaminated layer and the second delaminated layer when said release liner is delaminated along said plane of weakness, and said first and second backing layers are two separate layers that are bonded to and readily removable from each other along respective back side surfaces.

3. The adhesive tape assembly as set forth in claim 2, wherein said release liner further comprises an intermediate bonding layer that bonds together the back side surfaces of said backing layers.

4. The adhesive tape assembly as set forth in claim 2, wherein the back side surfaces of said backing layers are in direct contact with each other.

5. The adhesive tape assembly as set forth in claim 2, wherein said first backing layer has a first melting point, and said second backing layer has a second melting point, wherein said second melting point is at least 10° C. (50° F.) greater than said first melting point.

6. The adhesive tape assembly as set forth in claim 5, wherein said first backing layer comprises at least one of a high density polyethylene, a medium density polyethylene, a low density polyethylene, a linear low density polyethylene, an ultra-low density polyethylene, a polypropylene, a copolyester, a thermoplastic polyolefin, an ethylene vinyl acetate copolymer, and combinations thereof; and said second backing layer comprises at least one of a polypropylene, a polyester, a thermoplastic polyolefin, a copolymer of polyethylene and polypropylene, a laminate of a thermoplastic polyolefin layer and a polyethylene layer, and combinations thereof.

7. The adhesive tape assembly as set forth in claim 1, wherein said release liner further comprises:
a first release layer having a first major surface defining said first major release surface; and
a second release layer having a second major surface defining said second major release surface;
wherein each of said first and second release layers comprises a silicone, a fluorocarbon, a low adhesive backsize, or a blend or combination thereof.

8. The adhesive tape assembly as set forth in claim 7, wherein each of first and second release layers comprises a silicone release material.

9. The adhesive tape assembly as set forth in claim 1, further comprising a tab bonded to said second back side surface, said tab being operatively adapted to facilitate removal of said second delaminated layer from said adhesive tape by pulling on said tab.

10. The adhesive tape assembly as set forth in claim 1, wherein said double-sided adhesive tape further comprises a foam core with said front adhesive side and said back adhesive side forming opposite sides thereof.

11. The adhesive tape assembly as set forth in claim 1, wherein the pressure sensitive adhesive for at least one of said adhesive sides is a high bond strength pressure sensitive adhesive that exhibits a bond strength of greater than about 112 g/cm after being bonded to a polyolefin surface and removed from the polyolefin surface at a removal rate of about 30 cm/min.

12. The adhesive tape assembly as set forth in claim 1, wherein the pressure sensitive adhesive for at least one of said adhesive sides is a high bond strength pressure sensitive adhesive that exhibits a bond strength of at least about 357 g/cm, after being bonded to a low density polyethylene surface for at least 24 hours and removed therefrom at a removal rate of about 30 cm/min.

13. The adhesive tape assembly as set forth in claim 1, wherein substrate is a body portion of a vehicle.

14. The adhesive tape assembly as set forth in claim 13 in combination with a tab, wherein said release liner has been partially delaminated lengthwise between said first and second major release surfaces so as to partially form said first delaminated layer and said second delaminated layer, and said tab is bonded to said second back side surface of said partially formed second delaminated layer so as to enable said second delaminated layer to be removed from said adhesive tape by pulling on said tab.

* * * * *